(12) United States Patent
Pearl

(10) Patent No.: US 7,200,762 B2
(45) Date of Patent: Apr. 3, 2007

(54) PROVIDING A LOW-POWER STATE PROCESSOR VOLTAGE IN ACCORDANCE WITH A DETECTED PROCESSOR TYPE

(75) Inventor: Lowell Raymond Pearl, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 478 days.

(21) Appl. No.: 10/675,793

(22) Filed: Sep. 30, 2003

(65) Prior Publication Data

US 2005/0071696 A1   Mar. 31, 2005

(51) Int. Cl.
*G06F 1/32* (2006.01)

(52) U.S. Cl. ................... 713/300; 713/320; 713/323

(58) Field of Classification Search ......... 713/300–375
See application file for complete search history.

(56) References Cited

U.S. PATENT DOCUMENTS

| | | | |
|---|---|---|---|
| 5,714,873 A * | 2/1998 | Hwang | 323/273 |
| 6,035,407 A * | 3/2000 | Gebara et al. | 713/300 |
| 6,327,663 B2 * | 12/2001 | Isaac et al. | 713/300 |
| 6,845,456 B1 * | 1/2005 | Menezes et al. | 713/320 |
| 6,944,783 B2 * | 9/2005 | Yu et al. | 713/340 |
| 2004/0019815 A1 * | 1/2004 | Vyssotski et al. | 713/322 |

* cited by examiner

*Primary Examiner*—Rehana Perveen
*Assistant Examiner*—Paul Yanchus, III
(74) *Attorney, Agent, or Firm*—Buckley, Maschoff & Talwalkar LLC

(57) ABSTRACT

According to some embodiments, a low-power state processor voltage is provided in accordance with a detected processor type.

16 Claims, 4 Drawing Sheets

PROVIDING A LOW-POWER STATE PROCESSOR VOLTAGE IN ACCORDANCE WITH A DETECTED PROCESSOR TYPE

BACKGROUND

In some cases, different types of processors will require different voltage levels. For example, one type of processor might require a first low-power state voltage (e.g., 1.0 volts) while another type of processor requires a second low-power state voltage (e.g., 0.8 volts). To provide an appropriate voltage level to a processor, different components (e.g., resistors) could be used on circuit boards for different types of processors. In this case, however, the components on a particular circuit board might need to be changed whenever one type of processor is replaced with a different type of processor (e.g., when a different type of processor is inserted into a socket on the circuit board). Moreover, changing the components could be a time consuming process that requires soldering by an experienced technician (and could also result in errors or damage to the components).

DETAILED DESCRIPTION

Figure 1:
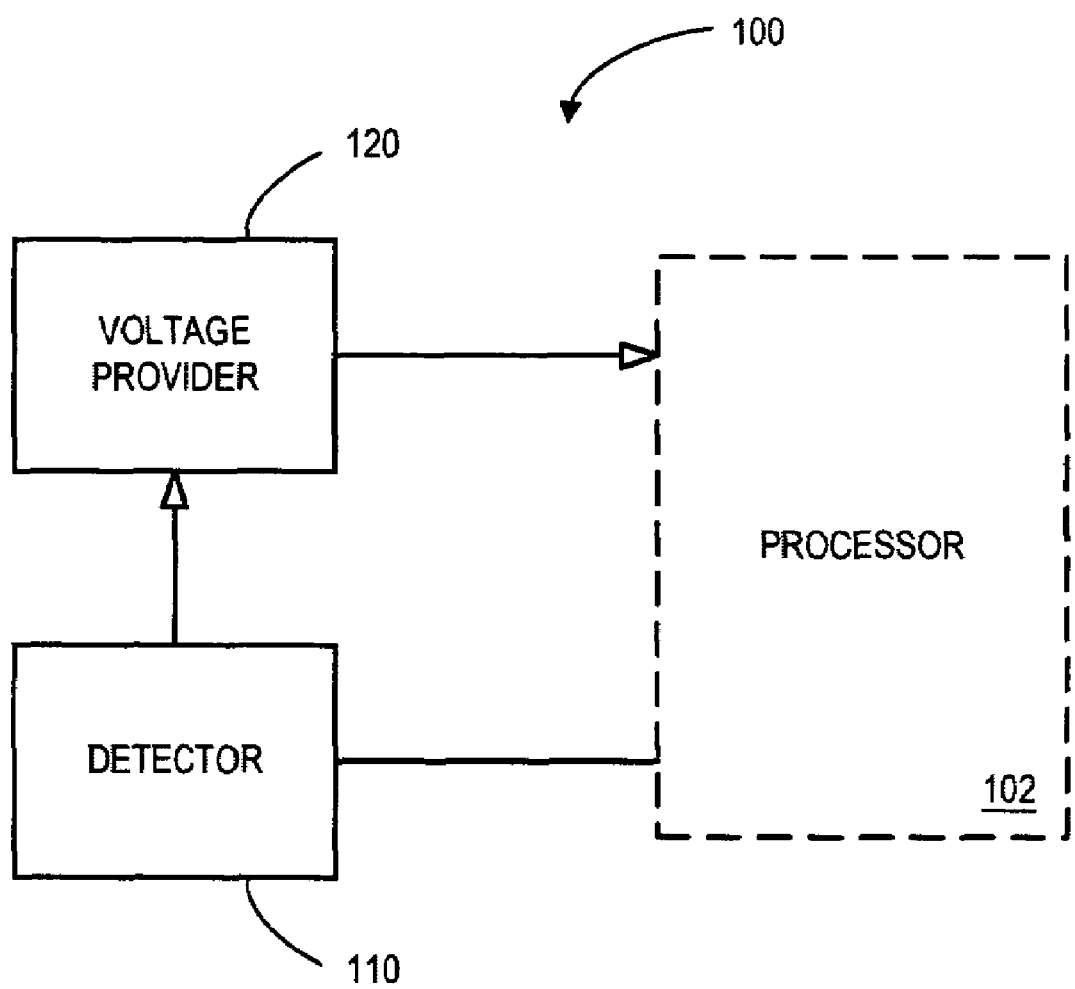
FIG. 1 is a block diagram of an apparatus according to some embodiments.

FIG. 1 is a block diagram of an apparatus 100 according to some embodiments. In particular, the apparatus 100 may provide a voltage for different types of processors 102 (e.g., different types of processors 102 that require different voltage levels may be inserted into a socket). For example, one type of processor 102 might require a particular low-power state voltage while another type of processor 102 requires a different low-power state voltage.

As illustrated in FIG. 1, the apparatus 100 includes a detector 110. The detector 110 may, for example, provide a signal indicating the type of processor that is currently present (e.g., is currently inserted into a socket). According to some embodiments, the detector 110 detects the processor type in accordance with a signal received from a processor pin. For example, the detector circuit 110 might indicate that a first type of processor is present when the signal is high and that a second type of processor is present when the signal is low.

The apparatus 100 also includes a voltage provider 120 to receive the indication from the detector 110 and provide an appropriate voltage to the processor 102 based on the indication (e.g., via a processor pin that is associated with a low-power state voltage). For example, the voltage provider 120 might provide a first voltage level when a first processor type is detected by the detector 110 and a second voltage level when a second processor type is detected.

Although a separate detector 110 and voltage provider 120 are illustrated in FIG. 1, according to some embodiments a single apparatus may act as both a detector 110 and a voltage provider 120. Moreover, the detector 110 and/or the voltage provider 120 might be associated with a voltage regulator integrated circuit or chip.

Figure 2:
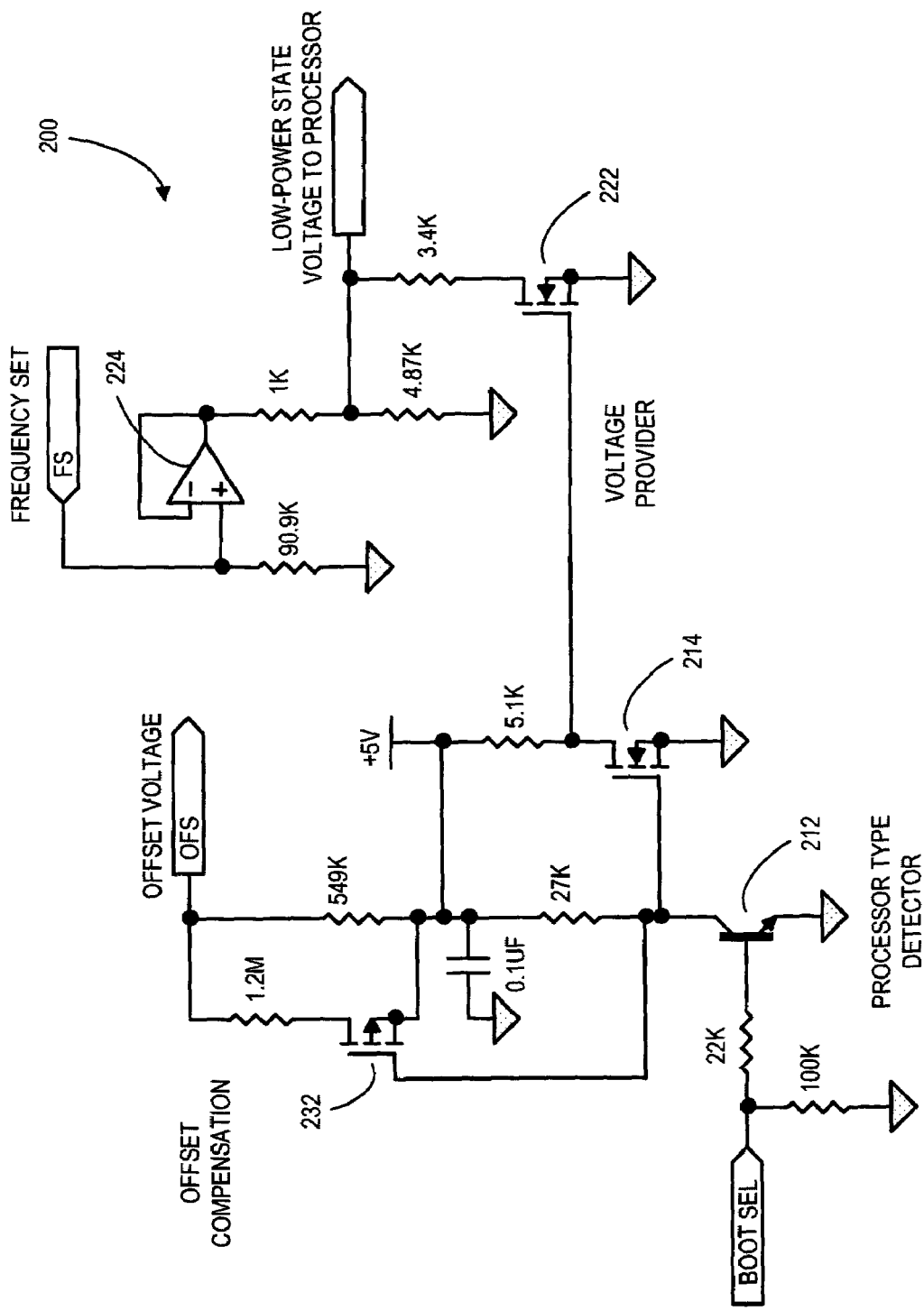
FIG. 2 is an example of a voltage regulator circuit according to some embodiments.

FIG. 2 is an example of a voltage regulator circuit 200 according to some embodiments. In this example, a first type of processor has an open BOOT SEL processor pin and needs to receive a 1.0 Volt (V) low-power state voltage (e.g., to support a "deeper sleep" power state). Moreover, a second type of processor internally pulls the BOOT SEL processor pin high and needs to receive a 0.8 V low-power state voltage.

A processor type detector portion of the circuit 200 includes a detection transistor 212 that receives a signal from the BOOT SEL pin. In particular, the detection transistor 212 may be a Bi-Polar Junction (BPJ) transistor having a base coupled to the BOOT SEL pin and a collector coupled to an inverter 214. The inverter 214 may comprise, for example, an n-channel inverter formed by a Field Effect Transistor (FET).

When the first type of processor is present (e.g., the one that requires 1.0 V), the BOOT SEL pin is open which causes the base of the detection transistor 212 to be pulled low. As a result, the detection transistor 212 turns off (i.e., its collector goes high) and the inverter 214 is turned on. On the other hand, the second type of processor (e.g., the one that needs to receive 0.8 V) would internally pull the BOOT SEL pin high, which turns on the detection transistor 212 and turns off the inverter 214.

A voltage provider portion of the circuit 200 includes a voltage divider that receives a 1.236 V reference voltage from a Frequency Set (FS) pin. According to some embodiments, an op-amp voltage follower 224 is included to avoid an inadvertent shift in processor frequency.

When the first type of processor is present (e.g., one that needs to receive 1.0 V), an inverter 222 in the voltage provider portion of the circuit 200 is turned off because the inverter 214 in the detection portion of the circuit 200 is turned on (as previously described). That is, when the inventor 214 is on, the drain of the inverter 214 is pulled low turning off the inverter 222. Because the inverter 222 is off, the low-power state voltage provided to the processor is the voltage drop across a 4.87 Kilo-Ohm (KΩ) resistor in the voltage divider, or 1.0 V. That is, the voltage level equals 1.236 V multiplied by 4.87 KΩ/(1 KΩ+4.87 KΩ), which is 1.025 V. Note that the voltage level may further be associated with a 25 millivolt offset value.

When the second type of processor is present (e.g., one that needs to receive 0.8 V), the inventor 222 is turned on (because the inverter 214 in the detection portion of the circuit 200 is off). As a result, a 3.7 KΩ resistor is introduced in parallel to the 4.87 KΩ resister, and the low-power state voltage provided to the processor is 0.8 V. That is, the two resistors in parallel have a resistance of 2 KΩ—and the voltage level therefore now equals 1.236 V multiplied by 2 KΩ/(1 KΩ+2 KΩ) or 0.825 V (which may again be associated with a 25 millivolt offset value).

According to some embodiments, an offset value associated with the processor voltage is adjusted in accordance with the processor type. For example, a maximum operating voltage might be reduced, or "offset," by an offset amount such that the reduced value is substantially near a mid-point of a range of operating voltages for that type of processor (e.g., a maximum operating voltage of 1.55 V might be reduced by 25 millivolts if that type of processor has a 50 millivolt range of operating voltages).

As illustrated in FIG. 2, an offset compensation portion of the circuit 200 may include an inverter 232 (e.g., a p-channel transistor) that receives a signal from the detection transistor 212 in the processor type detector portion. When the inverter 232 is turned on, a 1.2 mega-ohm resistor is placed in parallel with the 549 KΩ offset setting resistor that is connected between the 5 V rail and an OFS pin.

Figure 3:
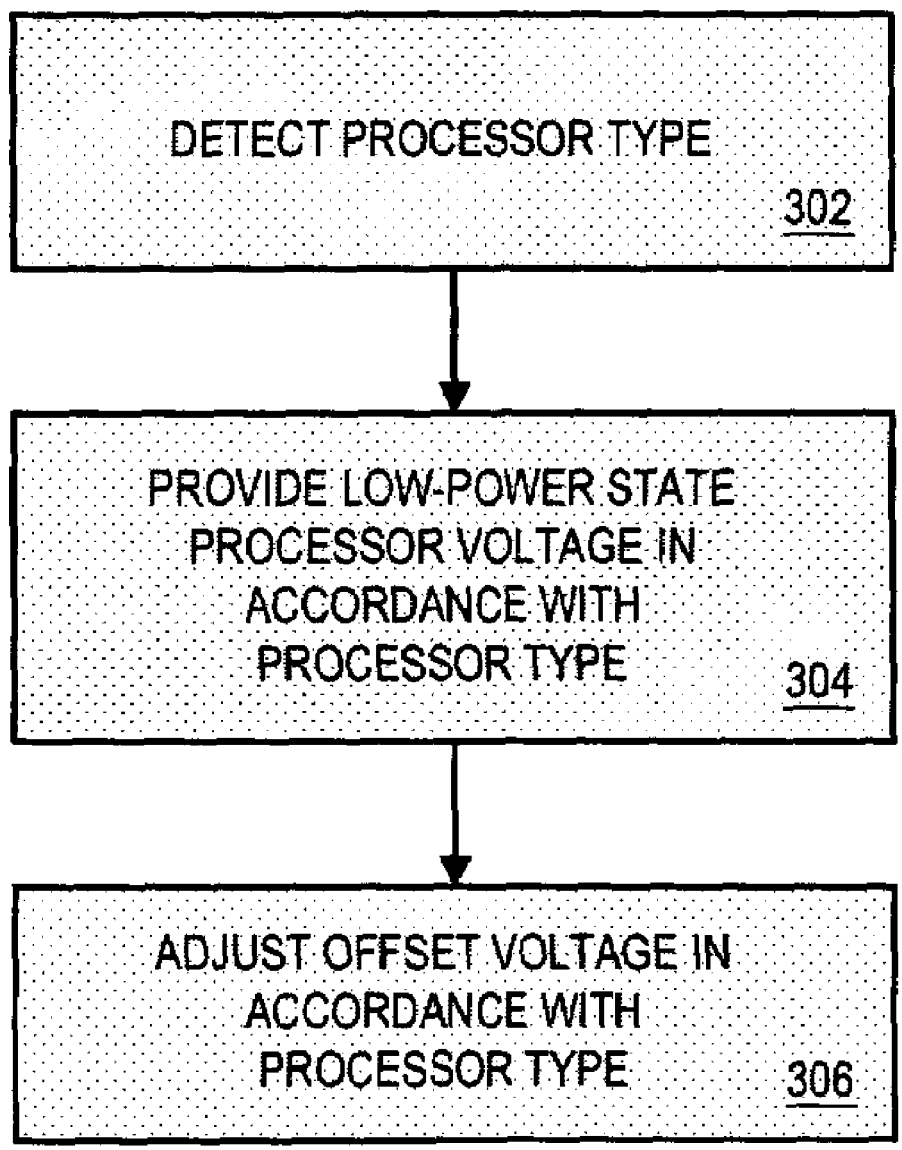
FIG. 3 is a flow chart of a method according to some embodiments.

FIG. 3 is a flow chart of a method according to some embodiments. The flow charts described herein do not necessarily imply a fixed order to the actions, and embodiments may be associated with any order that is practicable. The method of FIG. 3 may be associated with, for example, the apparatus 100 of FIG. 1 and/or the circuit 200 of FIG. 2.

At 302, a processor type is detected. For example, a signal received from a processor pin might be used to determine which type of processor is currently present in a socket. At 304, a low-power state voltage is provided to the processor in accordance with the processor type. For example, a first voltage level might be supplied for a first processor type while a second voltage level would be supplied for a second processor type. According to some embodiments, an offset value is adjusted at 306 in accordance with the processor type.

In this way, a single circuit board and set of components might support different types of processors that require different voltages (e.g., the circuit board might have a socket that can receive different types of processors). In other words, appropriate voltages may be provided without needing to replace the components on the circuit board (which might save time as well as reduce the risk of errors or damage caused by the replacement).

Figure 4:
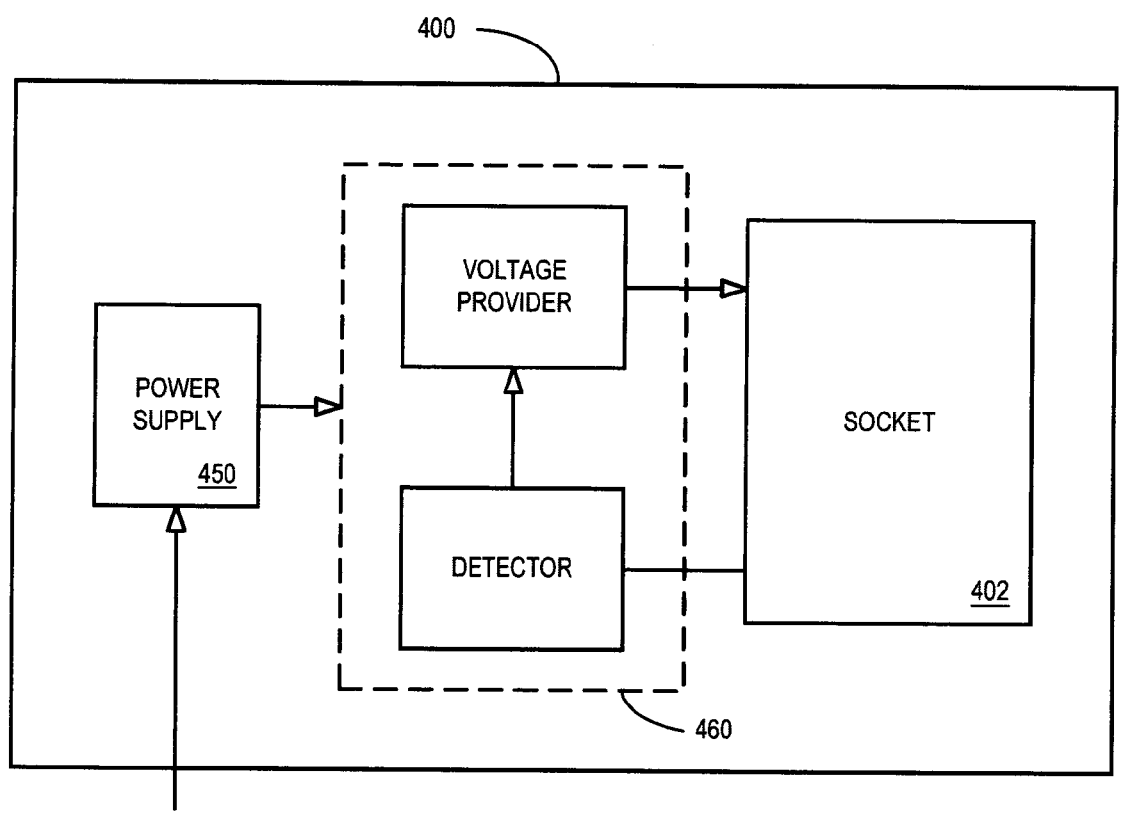
FIG. 4 is a block diagram of a system according to some embodiments.

FIG. 4 is a block diagram of a system 400 according to some embodiments. The system 400 may be associated with, for example, a circuit board with a socket 402 that is able to receive different types of processors. The system 400 also includes a power supply 450 to convert Alternating Current (AC) power to Direct Current (DC) power. According to another embodiment, a battery is instead used to provide power for the system 400.

A voltage regulator 460 coupled to the power supply 450 may provide a voltage to a processor in accordance with any of the embodiments described herein. For example, the voltage regulator 460 may provide a first low-power state voltage level when a first type of processor is in the socket 402 and a second low-power state voltage level when a second type of processor is in the socket 402.

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Although some embodiments have been described with respect to two processor types, embodiments may support more that two types of processors. For example, three different types of processor might need three different voltage levels.

Moreover, although some embodiments have been described with respect to low-power state voltages, embodiments may be associated with any voltages that are provided to a processor. For example, different $V_{CC}$ voltage levels might be provided to different types of host processors.

Similarly, although particular circuits and components have been described, embodiments may be associated with any types of circuits or components that perform any of the functions described herein.

The several embodiments described herein are solely for the purpose of illustration. Persons skilled in the art will recognize from this description other embodiments may be practiced with modifications and alterations limited only by the claims.

What is claimed is:

1. An apparatus, comprising:
a detector circuit to detect a processor type in accordance with a signal from a processor pin, including:
a transistor having a base to receive the signal from the processor pin, wherein the transistor is on when a first processor type is present and off when a second processor type is present;
a voltage provider circuit to provide a low-power state processor voltage in accordance with the processor type; and
an offset voltage circuit to adjust an offset value in accordance with the processor type.

2. The apparatus of claim 1, wherein the transistor comprises a bi-polar junction transistor and the collector of the transistor provides a processor type signal to the voltage provider circuit.

3. The apparatus of claim 1, wherein the voltage provider circuit provides a first voltage level when a first processor type is detected and a second voltage level when a second processor type is detected.

4. The apparatus of claim 3, wherein the voltage provider circuit includes: a voltage divider.

5. The apparatus of claim 4, wherein the voltage provider circuit receives a processor type signal from the detector circuit and further includes:
a transistor to adjust a resistance associated with the voltage divider in accordance with the processor type signal.

6. The apparatus of claim 5, wherein the transistor comprises an n-channel inverter.

7. The apparatus of claim 1, wherein the detector circuit and the voltage provider circuit are associated with a voltage regulator integrated circuit.

8. An apparatus, comprising:
a transistor having a base to receive a signal from a processor pin, wherein the transistor is on when a first processor type is present and off when a second processor type is present;
an input to receive from the transistor a signal associated with a processor type;
a first output to provide a low-power state processor voltage in accordance with the processor type; and
a second output to provide an offset voltage value in accordance with the processor type.

9. The apparatus of claim 8, wherein a first voltage level is provided for the first processor type and a second voltage level is provided for the second processor type.

10. The apparatus of claim 8, wherein the first output provides an output signal to another processor pin.

11. An apparatus, comprising:
a first transistor, including
a base to receive a signal from a processor pin, the first transistor being on when a first processor type is present and off when a second processor type is present, and
a collector to provide a processor type signal; and
a second transistor, including:
a gate to receive the processor type signal,
wherein the second transistor is to adjust a resistance associated with a voltage divider such that one of a first and a second low-power state processor voltage is provided from the voltage divider in accordance with the processor type signal.

12. The apparatus of claim 11, wherein the apparatus comprises a voltage regulator integrated circuit.

13. A method, comprising:
    detecting a processor type via a transistor having a base to receive a signal from a processor pin, wherein the transistor is on when a first processor type is present and off when a second processor type is present;
    providing a low-power state processor voltage in accordance with the processor type; and
    adjusting an offset value in accordance with the processor type.

14. The method of claim 13, wherein a first voltage level is provided when the first processor type is detected and a second voltage level is provided when the second processor type is detected.

15. A system, comprising:
    a power supply to convert alternating current power to direct current power; and
    a voltage regulator coupled to the power supply and including:
        a detector circuit to detect a processor type, including a transistor having a base to receive a signal from a processor pin, wherein the transistor is on when a first processor type is present and off when a second processor type is present,
        a voltage provider circuit to provide a low-power state processor voltage in accordance with the processor type;
        an offset voltage circuit to adjust an offset value in accordance with the processor type.

16. The system of claim 15, wherein a first voltage level is provided when the first processor type is detected and a second voltage level is provided when the second processor type is detected.

* * * * *